United States Patent
Bell et al.

(10) Patent No.: US 9,736,321 B2
(45) Date of Patent: Aug. 15, 2017

(54) CHANGING A DATA STREAM CHARACTERISTIC BASED ON A DATA USAGE RATE

(71) Applicant: INTERNATIONAL BUSINESS MACHINES CORPORATION, Armonk, NY (US)

(72) Inventors: Mark Bell, Mont Fleuri (FR); Gregory J. Boss, Saginaw, MI (US); Peter G. Finn, Markham (CA); Rick A. Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 14/290,277

(22) Filed: May 29, 2014

(65) Prior Publication Data
US 2015/0350956 A1    Dec. 3, 2015

(51) Int. Cl.
*H04M 15/00* (2006.01)
*H04W 4/24* (2009.01)
*H04L 12/14* (2006.01)

(52) U.S. Cl.
CPC .... *H04M 15/8214* (2013.01); *H04L 12/1417* (2013.01); *H04L 12/1435* (2013.01);
(Continued)

(58) Field of Classification Search
CPC . H04M 2215/0116; H04M 2215/0132; H04M 15/80; H04W 9/18; H04W 24/02;
(Continued)

(56) References Cited

U.S. PATENT DOCUMENTS

| 8,819,667 | B2 * | 8/2014 | Wang | 717/171 |
| 2012/0092990 | A1 * | 4/2012 | Tapia | H04L 41/083 370/232 |

(Continued)

FOREIGN PATENT DOCUMENTS

EP    2123048    7/2008

OTHER PUBLICATIONS

MSDN, Microsoft; How to adjust data usage using the Data Sense API for Windows Phone 8; Windows Phone Development Center; Aug. 2, 2013; 7 pages.

*Primary Examiner* — Anthony Addy
*Assistant Examiner* — Martin Chang
(74) *Attorney, Agent, or Firm* — Schmeiser, Olsen & Watts; John Pivnichny

(57) ABSTRACT

An approach is provided for adjusting a characteristic of a data stream. A rate of data usage provided by one or more data streams within a time period that has not ended is determined. An amount of time remaining in the time period is determined. Based at least in part on the amount of time remaining in the time period and the rate of data usage, an expected amount of data usage within the entire time period is determined. Whether the expected amount of data usage exceeds a limit on data usage within the entire time period is determined. If the expected amount of data usage exceeds the limit, the characteristic of the data stream is adjusted so that actual data usage within the entire time period does not exceed the limit. The actual data usage is based in part on the adjusted characteristic.

16 Claims, 5 Drawing Sheets

(52) U.S. Cl.
CPC ........ *H04L 12/1439* (2013.01); *H04M 15/58* (2013.01); *H04M 15/60* (2013.01); *H04M 15/8038* (2013.01); *H04M 15/83* (2013.01); *H04M 15/85* (2013.01); *H04M 15/852* (2013.01); *H04W 4/24* (2013.01)

(58) Field of Classification Search
CPC ............... H04W 72/06; H04W 72/048; H04W 72/1247; H04W 88/181; H04L 12/1435; H04L 41/5003; H04N 4/001
USPC ........ 709/231, 232, 233, 247; 370/230, 232, 370/235; 455/405, 406
See application file for complete search history.

(56) References Cited

U.S. PATENT DOCUMENTS

| | | |
|---|---|---|
| 2012/0254417 A1 | 10/2012 | Luna |
| 2013/0016624 A1* | 1/2013 | Li et al. .................... 370/252 |
| 2013/0023230 A9 | 1/2013 | Momtahan et al. |
| 2013/0182554 A1 | 7/2013 | Poon et al. |
| 2013/0295877 A1* | 11/2013 | Leemet .................. H04L 12/14 455/405 |
| 2013/0346624 A1* | 12/2013 | Chervets et al. ............. 709/231 |
| 2014/0173111 A1* | 6/2014 | Varner ......................... 709/225 |
| 2014/0380303 A1* | 12/2014 | Bello et al. ...................... 718/1 |

\* cited by examiner

CHANGING A DATA STREAM CHARACTERISTIC BASED ON A DATA USAGE RATE

TECHNICAL FIELD

The present invention relates to managing a data stream, and more particularly to adjusting a characteristic of a data stream based on a data usage rate.

BACKGROUND

A significant portion of mobile device service plans, both prepaid and postpaid, place a quota on the amount of data which a user can consume in a given billing period and apply an overage charge if the user exceeds the quota. Even many so-called "unlimited" plans are not truly unlimited, because exceeding a predetermined threshold can have negative consequences. Some wireless carriers, for example, reduce throughput for customers who have exceeded a predetermined data limit on what is otherwise called an "unlimited" data plan. Unlimited plans can also be limited in their performance. A common practice of wireless carriers is to provide a previous generation network at an unlimited usage rate but a current generation network at a capped rate with overage charges. With roaming, these overage charges can be exorbitant and potentially cost a user thousands of dollars in a very short period of time. Most wireless carriers simply charge customers on a per megabyte or gigabyte basis for overages or roaming. These charges can accumulate into a significant amount quickly and cause significant expense to the customer.

BRIEF SUMMARY

In a first embodiment, the present invention provides a method of adjusting a characteristic of a data stream to a computer. The method includes the computer recording an amount of data usage provided by one or more data streams to the computer within a first portion of a time period. The first portion has elapsed and the time period has not elapsed. The method further includes, based on the recorded amount of data usage and an amount of time in the first portion, the computer determining a current rate of data usage provided by the one or more data streams within the first portion of the time period. The method further includes the computer determining a limit on actual data usage by the computer during an entirety of the time period. The method further includes the computer determining an amount of time in a second portion of the time period, which is subsequent to the first portion and has not elapsed. The method further includes, based at least in part on the amount of time in the second portion and the current rate of data usage, the computer determining an expected amount of data usage provided by all data streams to the computer within the first and second portions of the time period. The method further includes the computer determining whether the expected amount of data usage exceeds the limit. The method further includes, based at least in part on the expected amount of data usage exceeding the limit, the computer adjusting the characteristic of the data stream so that a new expected data usage does not exceed the limit. The new expected data usage is based in part on the adjusted characteristic and provided by at least the one or more data streams in the first portion of the time period and the data stream in the second portion of the time period.

In a second embodiment, the present invention provides a computer system including a central processing unit (CPU); a memory coupled to the CPU; and a computer-readable storage device coupled to the CPU. The storage device includes instructions that are executed by the CPU via the memory to implement a method of adjusting a characteristic of a data stream to the computer system. The method includes the computer system recording an amount of data usage provided by one or more data streams to the computer system within a first portion of a time period. The first portion has elapsed and the time period has not elapsed. The method further includes, based on the recorded amount of data usage and an amount of time in the first portion, the computer system determining a current rate of data usage provided by the one or more data streams within the first portion of the time period. The method further includes the computer system determining a limit on actual data usage by the computer system during an entirety of the time period. The method further includes the computer system determining an amount of time in a second portion of the time period, which is subsequent to the first portion and has not elapsed. The method further includes, based at least in part on the amount of time in the second portion and the current rate of data usage, the computer system determining an expected amount of data usage provided by all data streams to the computer system within the first and second portions of the time period. The method further includes the computer system determining whether the expected amount of data usage exceeds the limit. The method further includes, based at least in part on the expected amount of data usage exceeding the limit, the computer system adjusting the characteristic of the data stream so that a new expected data usage does not exceed the limit. The new expected data usage is based in part on the adjusted characteristic and provided by at least the one or more data streams in the first portion of the time period and the data stream in the second portion of the time period.

In a third embodiment, the present invention provides a computer program product including a computer-readable storage device and a computer-readable program code stored in the computer-readable storage device. The computer-readable program code includes instructions that are executed by a central processing unit (CPU) of a computer system to implement a method of adjusting a characteristic of a data stream. The method includes the computer system. The method includes the computer system recording an amount of data usage provided by one or more data streams to the computer system within a first portion of a time period. The first portion has elapsed and the time period has not elapsed. The method further includes, based on the recorded amount of data usage and an amount of time in the first portion, the computer system determining a current rate of data usage provided by the one or more data streams within the first portion of the time period. The method further includes the computer system determining a limit on actual data usage by the computer system during an entirety of the time period. The method further includes the computer system determining an amount of time in a second portion of the time period, which is subsequent to the first portion and has not elapsed. The method further includes, based at least in part on the amount of time in the second portion and the current rate of data usage, the computer system determining an expected amount of data usage provided by all data streams to the computer system within the first and second portions of the time period. The method further includes the computer system determining whether the expected amount of data usage exceeds the limit. The method further includes, based at least in part on the expected amount of data usage exceeding the limit, the computer system adjusting the characteristic of the data stream so that a new expected data usage does not exceed the limit. The new expected data usage is based in part on the adjusted characteristic and provided by at least the one or more data streams in the first portion of the time period and the data stream in the second portion of the time period.

Embodiments of the present invention provide adjustments to data stream characteristics based on a current data usage rate, thereby avoiding fees or other penalties imposed by a network operator or carrier for data usage that exceeds a data usage limit.

DETAILED DESCRIPTION

Overview

Embodiments of the present invention record data usage by a user running application(s) on a computing device in a specified time period (e.g., a one-month billing cycle), calculates current data usage rate(s) for the application(s), use the current data usage rate(s) and an amount of time remaining in the specified time period to extrapolate the recorded data usage to an expected data usage over the entire specified time period, and compare the expected data usage to a data usage limit. If the expected data usage exceeds the data usage limit, one or more characteristics of data streams requested in the time remaining in the specified time period are modified so that a data usage rate during the time remaining in the specified time period is lower than a corresponding current data usage rate, which results in an actual data usage throughout the entire specified time period not exceeding the data usage limit. By not exceeding the data usage limit, overage costs for exceeding the data usage limit are avoided.

System for Adjusting a Data Stream Characteristic Based on a Data Usage Rate

Figure 1:
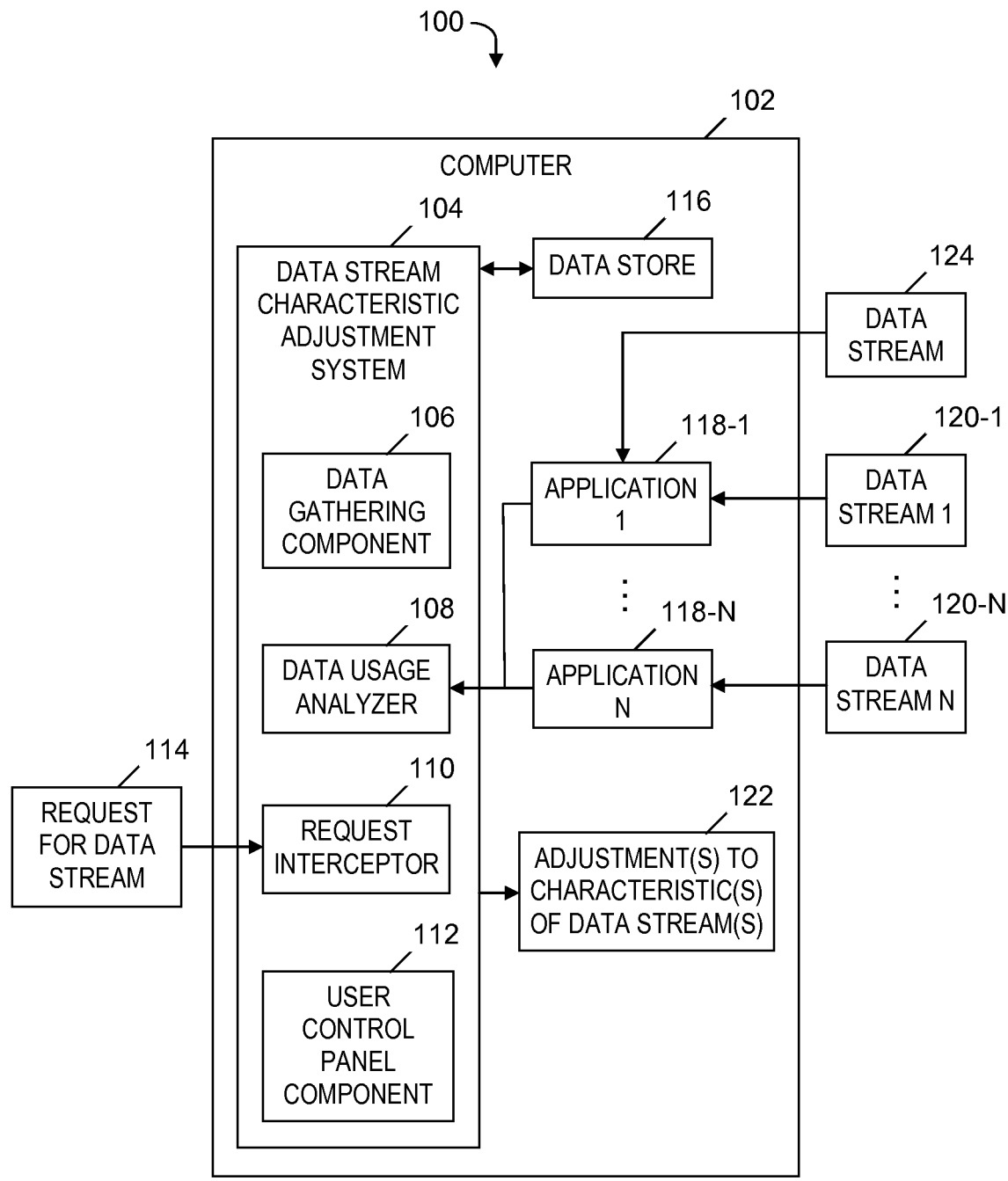
FIG. 1 is a block diagram of a system for adjusting a data stream characteristic, in accordance with embodiments of the present invention.

FIG. 1 is a block diagram of a system 100 for adjusting a data stream characteristic, in accordance with embodiments of the present invention. System 100 includes a computer 102, which executes a software-based data stream characteristic adjustment system 104, which includes a data gathering component 106, a data usage analyzer 108, a request interceptor 110 and a user control panel component 112. In one embodiment, computer 102 is a mobile computing device such as a smartphone, and data stream characteristic adjustment system 104 is included in an operating system (not shown) running in computer 102 or is an application executed in computer 102. In an alternate embodiment, data stream characteristic adjustment system 104 does not include user control panel component 112. In another alternate embodiment, any combination of data gathering component 106, data usage analyzer 108 and request interceptor 110 reside on a cloud server or a server hosted by a service provider who provides the data stream whose characteristic(s) are adjusted by the data stream characteristic adjustment system 104.

Data gathering component 106 collects account credentials of a user of computer 102 and uses the collected account credentials to access the user's data usage plan information, including the billing cycle start and end dates, and data usage limits imposed on the user's account. Alternatively, data gathering component 106 collects the data usage plan information by manual entries by the user. Data gathering component 106 stores the collected data usage plan information in a data store 116.

Data usage analyzer 108 monitors data usage occurring on the computer 102, which includes recording the date, time and amount of data usage and optionally recording the type of data and metrics about data compression, data quality, and/or data rate. The amount of data usage includes data streams received by application 118-1, . . . , application 118-N (i.e., application 1, . . . , application N) installed on computer 102, where N is an integer greater than or equal to one. Application 1, . . . , application N receive data streams 120-1, . . . , 120-N (i.e., data stream 1, . . . , data stream N), respectively.

Data usage analyzer 108 determines a current data usage rate by applications 1, . . . , N based on the amount of data usage in a first portion of a specified time period (e.g., the billing cycle), where the first portion has elapsed. In one embodiment, the specified time period is stored in data store 116.

Based at least in part on the current data usage rate, data usage analyzer 108 extrapolates an amount of data that will be consumed in a second portion of the specified time period, where the second portion starts subsequent to the end of the first portion and the second portion has not yet elapsed. The determination of the extrapolated amount of data is based on an assumption that data usage in the second portion will be based on the current data usage rate and may also be based on historical data usage in periods of time that are similar to the second portion of the specified time period. For example, if the specified time period is the month of December of year YYYY and the second portion of the month of December is the last week of December, then historical data usage in a period of time that is similar to the second portion may include historical data usage in the last week of months January through November of year YYYY, and/or in the last week of the months of December in the ten years that precede year YYYY.

After determining the extrapolated amount of data. Data usage analyzer 108 determines the deficit or overage, if any, between the anticipated data usage in the entire specified time period and the data usage limit imposed on the user's account. The anticipated data usage in the entire specified time period is greater than the data usage limit (i.e., there is an expected overage), then data usage analyzer 108 authorizes a corrective action. The corrective action reduces data consumption at a platform level or at the service levels offered by particular applications executing in computer 102. In one embodiment, the corrective action is to reduce data consumption by all of applications 118-1, . . . , 118-N installed on computer 102. Alternatively, in a case in which N is greater than one, the corrective action is to reduce data consumption by one or more of the N applications but not reducing data consumption by one or more other applications included in the N applications. Data stream characteristic adjustment system 104 reduces data consumption by determining adjustment(s) 122 to characteristic(s) of one or more data streams, including a data stream 124, which is received in the second portion of the specified time period in response to a request 114. Data stream 1, . . . , data stream N are received by computer 102 within the first portion of the specified time period.

In another embodiment, data usage analyzer 108 assesses the expected overage value and publishes the expected overage value to request interceptor 110. Data usage analyzer 108, request interceptor 110 or user input via user control panel component 112 determines a severity of the corrective action.

In the case of an expected overage, data usage analyzer 108 may predict the likely cost at the current data usage rate, and also costs under a variety of different mitigation strategies. For example, data usage analyzer 108 may provide three mitigation strategies: (1) continue current data usage patterns with no restrictions, which results in a first overage and a $50 penalty for the first overage; (2) impose mild restrictions whereby high definition video downloads are restricted, which results in a second overage and a $10 penalty for the second overage; or (3) impose heavy restrictions whereby all media downloads are prohibited, which results in actual data usage which is under the data usage limit and no monetary penalty.

Request interceptor 110 monitors request(s) from a user of computer 102 to consume data, determines which type(s) of data have characteristic(s) that can be adjusted, and intercepts the request(s) before the request(s) are sent to service provider(s). Types of data include movies and audio files. Request interceptor 110 intercepts request 114 for data stream 124, where the type of the data in data stream 124 has been determined by request interceptor 110 to have one or more characteristics that can be adjusted to decrease data consumption as a corrective action determined by data usage analyzer 108.

For example, in response to data usage analyzer 108 determining an expected overage and prior to a video streaming service provider XYZ receiving request 114 from computer 102, request interceptor 110 intercepts request 114 for data stream 124 to stream a video ABC to computer 102. Request interceptor 110 modifies request 114 to create the adjustment 122 to a characteristic of data stream 124. In this example, the modification of request 114 includes a lowering of the quality of data stream 124, where the amount that the quality is lowered is based on the current data usage rate determined by data usage analyzer 108. The request 114 for video ABC may include an argument attached to a Uniform Resource Identifier (URI) to indicate a display resolution of the video (e.g., 1080, 720, 480, 320, etc. horizontal lines of resolution). Request interceptor 110 changes the aforementioned argument before sending the request to video service provider WXY to generate the adjustment 122 which compensates for the expected overage so that the actual data usage in the specified time period does not exceed the data usage limit.

In one embodiment, request interceptor 110 accesses data store 116 to obtain a list of types of streamed data, respective service providers, and instructions specific to each combination of type of streamed data and service provider, where the instructions specify how to modify data stream 124 to either reduce or increase the data usage rate.

User control panel component 112 provides an interface that allows a user of computer 102 to prioritize application 1, . . . , application N, prioritize data types, prioritize categories of content, and/or enter or update configurable settings or override default settings of the applications 1, . . . N, which include a combination of: (1) upload cap, (2) download cap, (3) upload speed, (4) download speed, (5) upload resolution, (6) download resolution, (7) access to send or receive texts or instant messages, and (8) other data usage characteristics. The user control panel component 112 may provide maximum and minimum settings for different characteristics such as upload and download speeds and upload and download resolutions. In one embodiment, the settings are specific to respective types of applications.

User control panel component 112 may provide an interface that allows a user of computer 102 to override the adjustment to a characteristic of a data stream 124 (see FIG. 1), which means that data stream characteristic adjustment system 104 does not change the request 114 to implement the adjustment. The interface may also allow the user to override adjustments on a per application or per type of application basis.

Data stream characteristic adjustment system 104 determines different adjustments 122 for respective types of data, respective categories of content, or respective service levels offered by corresponding applications. Categories of content may be derived from Electronic Program Guide (EPG) data. For example, because a user may willingly sacrifice quality in video files, but not audio files, video files are assigned a lower priority than audio files via user control panel component 112, and data usage analyzer 108 determines the adjustment 122 in a characteristic of streaming video files that is more aggressive than an adjustment in a characteristic of audio files. As another example, the user may enter settings via user control panel component 112 to indicate that the quality of video content that is categorized as new and including current affairs may be restricted, but the quality of video content included in a feature film may not be restricted. As yet another example, the user may enter settings via user control panel component 112 to indicate that an audio file categorized as popular music is allowed to be restricted more heavily than audio files that are categorized as classical or jazz music.

In one embodiment, the interface provided by user control panel component 112 includes application types that are grouped or broken down into specific applications and associated data requirements, and provides available data usage settings for the data requirements, and priorities assigned to the applications and associated data requirements.

In one embodiment, the interface provided by user control panel component 112 displays the currently predetermined settings based on expected data usage. Any changes to one of the settings may cause automatic changes to one or more other settings. For example, increasing upload speed for one application may automatically reduce upload speed for another application in order to keep the expected data usage below the data usage limit.

Data stream characteristic adjustment system 104 may apply a policy that permits actual data usage to reach a specified proportion of a data usage limit before mitigation strategies are introduced which adjust one or more characteristics of data stream(s). Alternatively, data stream characteristic adjustment system 104 may apply mitigation strategies continuously, so that one or more characteristics of data stream(s) are adjusted throughout a specified time period.

In one embodiment (hereinafter, "two computer system embodiment"), system 100 is replaced with a system (not shown) that includes first and second computer systems (or first and second computers) (not shown). The first computer system includes at least one processor and at least one memory, executes data stream characteristic adjustment system 104, but does not consume data streams. The second computer system includes at least one processor and at least one memory, executes applications 1, . . . , N, and consumes data streams 1, . . . , N and data stream 124. Data stream characteristic adjustment system 104 in the first computer system intercepts request 114 for data stream 124, generates adjustment(s) 122 for request 114, modifies request 114 according to adjustment(s) 122, and sends the modified request to application 118-1 in the second computer system so that expected data usage by the second computer system in the specified time period is less than the data usage limit.

The functionality of the components of FIG. 1 is described in more detail in the discussion presented below relative to FIG. 2, FIG. 3, FIG. 4 and FIG. 5.

Process for Adjusting a Data Stream Characteristic Based on a Data Usage Rate

Figure 2:
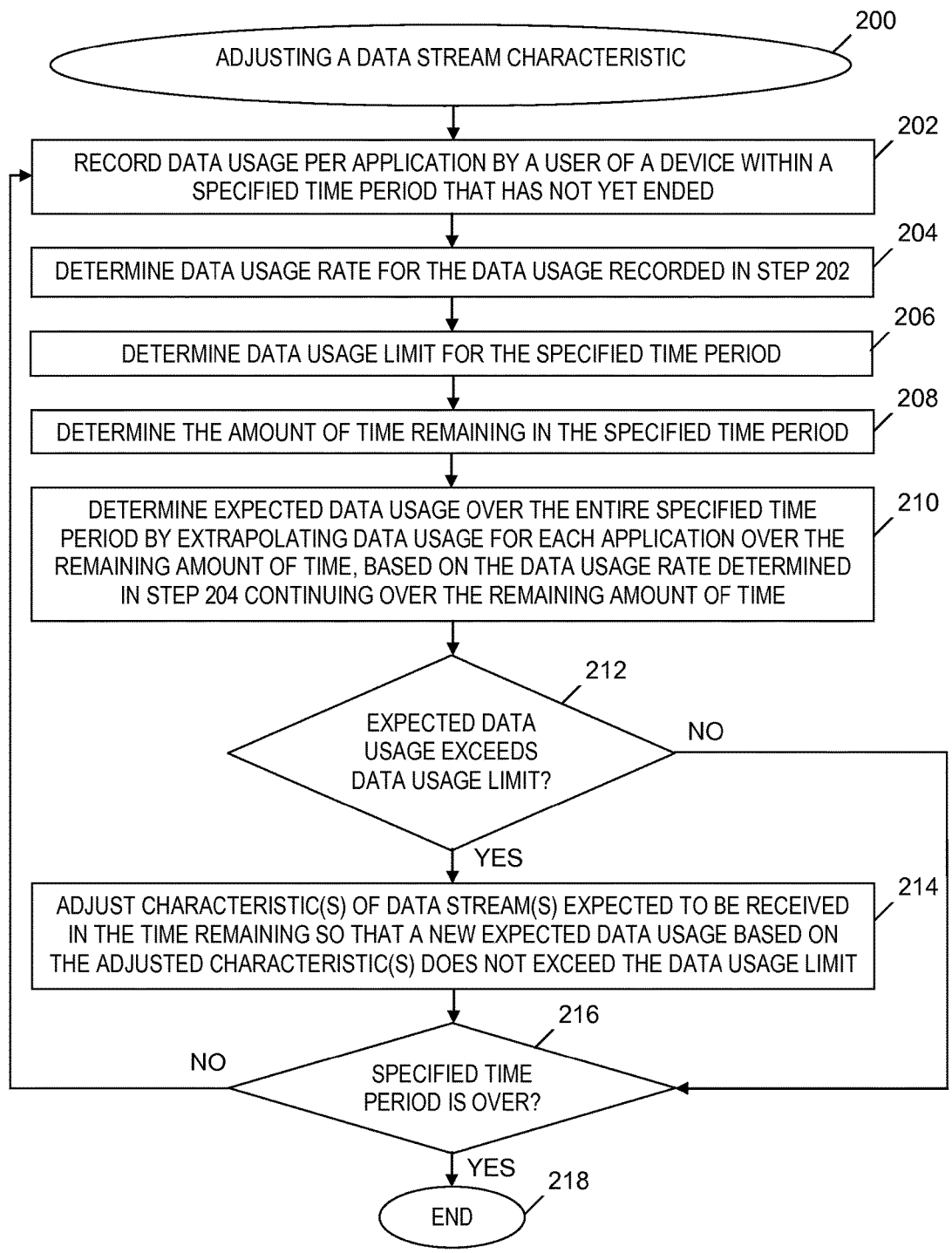
FIG. 2 is a flowchart of a process of adjusting a data stream characteristic, where the process is implemented in the system of FIG. 1, in accordance with embodiments of the present invention.

FIG. 2 is a flowchart of a process of adjusting a data stream characteristic, where the process is implemented in the system of FIG. 1, in accordance with embodiments of the present invention. In the description of the process of FIG. 2 presented below, computer 102 is both the computer that executes data stream characteristic adjustment system 104 (see FIG. 1) and the computer that consumes data stream 120-1, . . . , 120-N (see FIG. 1) and data stream 124 (see FIG. 1). The present invention, however, contemplates another process that is a modification of the process of FIG. 2, where the modified process has steps performed by the first computer system of the two computer system embodiment described above, and where the adjustment(s) 122 (see FIG. 1) generated by the first computer system are applied to request 114 (see FIG. 1) for data stream 124 (see FIG. 1) to be consumed by application 118-1 (see FIG. 1) being executed by the second computer system of the two computer system embodiment described above.

The process of FIG. 2 starts at step 200. In step 202, data stream characteristic adjustment system 104 (see FIG. 1) records an amount of data usage for each of applications 118-1, . . . , 118-N (see FIG. 1), where the data usage is provided by one or more of data streams 120-1, . . . , 120-N. The data usage occurred in a first portion of a specified time period (e.g., a first part of a monthly billing cycle), where the first portion has elapsed but the specified time period has not ended. Data stream characteristic adjustment system 104 (see FIG. 1) determines the amount of time in the first portion of the specified time period.

In step 204, based on the amount of time in the first portion of the specified time period and the amount of data usage recorded in step 202, data stream characteristic adjustment system 104 (see FIG. 1) determines a current data usage rate for the data usage that occurred during the first portion of the specified time period.

In step 206, data stream characteristic adjustment system 104 (see FIG. 1) determines a data usage limit for the entire specified time period (i.e., the limit on the user's actual data usage within the specified time period, where the limit is imposed by a service provider such as a mobile network operator, mobile network carrier, wireless service provider, or cellular company). In one embodiment, data stream characteristic adjustment system 104 (see FIG. 1) receives the data usage limit from a user entry or from a service provider. In another embodiment, data stream characteristic adjustment system 104 (see FIG. 1) retrieves the data usage limit from data store 116 (see FIG. 1).

Alternatively, data stream characteristic adjustment system 104 (see FIG. 1) determines in step 206 N data usage limits for respective applications 118-1, . . . , 118-N (see FIG. 1). It will be apparent to those skilled in the art that the subsequent steps in FIG. 2 can be modified in order to be based on N data usage limits instead of a single data usage limit.

In step 208, data stream characteristic adjustment system 104 (see FIG. 1) determines an amount of time in a second portion of the specified time period, where the second portion begins subsequent to the end of first portion, and the second portion has not elapsed. In one embodiment, the second portion is the amount of time remaining in the specified time period from the end of the aforementioned first portion.

In step 210, based at least in part on the amount of time in the second portion of the specified time period and the current data usage rate determined in step 204, data stream characteristic adjustment system 104 (see FIG. 1) employs extrapolation to determine an expected amount of data usage for each of applications 118-1, . . . , 118-N (see FIG. 1) in the entire specified time period, where the expected amount of data usage consists of the amount of data usage recorded in step 202 plus another amount of data usage by applications 118-1, . . . , 118-N (see FIG. 1) in the second portion of the specified time period. Data stream characteristic adjustment system 104 (see FIG. 1) determines the aforementioned other amount of data usage based at least on an assumption that the current data usage rate for each application will continue over the second portion of the specified time period. The determination of the other amount of data usage in the second portion may also be based on anticipated data usage in the second portion that matches historical data usage that occurred in portion(s) of historical time period(s), where the match is based on the second portion being similar to the portion(s) of the historical time period(s). For example, the second portion of a current month and a portion of a previous month are similar because the second portion and the portion of the previous month both occur in the last week of their respective months.

In another embodiment, data stream characteristic adjustment system 104 (see FIG. 1) employs a predictive technique to improve upon the aforementioned extrapolation to determine the expected data usage in the entire specified time period. The predictive technique determines the expected data usage based on knowledge that specified calendar events have a higher or lower data usage than the data usage that would be expected based on historical data usage over previous time periods. The specified calendar events may include weekends, holidays, vacations, etc.

In step 212, data stream characteristic adjustment system 104 (see FIG. 1) determines whether the expected amount of data usage determined in step 210 exceeds the data usage limit determined in step 206. If data stream characteristic adjustment system 104 (see FIG. 1) determines in step 212 that the expected amount of data usage exceeds the data usage limit, then the Yes branch of step 212 is taken and step 214 is performed.

Prior to step 214, request interceptor 110 in data stream characteristic adjustment system 104 (see FIG. 1) intercepts request 114 (see FIG. 1) for data stream 124 (see FIG. 1) before the request 114 (see FIG. 1) is sent to application 118-1 (see FIG. 1). Request 114 includes one or more parameters that indicate the level of resolution and/or the level of performance of data stream 124 (see FIG. 1).

Request 114 (see FIG. 1) is a request for a data stream for video, audio, or another type of content having high bandwidth requirements.

In step 214, based at least in part on the expected amount of data usage exceeding the data usage limit determined in step 206, data stream characteristic adjustment system 104 (see FIG. 1) generates the adjustment 122 (see FIG. 1) to a characteristic of the data stream 124 (see FIG. 1), so that a new expected amount of data usage based in part on the adjustment 122 (see FIG. 1) does not exceed the data usage limit determined in step 206. The new expected amount of data usage is provided by at least (1) the one or more data streams that were received by computer 102 (see FIG. 1) in the first portion of the specified time period and in response to requests by applications 118-1, . . . , 118-N (see FIGS. 1); and (2) the data stream 124 (see FIG. 1) that is likely to be received in the second portion of the specified time period.

In response to the interception of request 114 (see FIG. 1), subsequent to step 214, and based on the generated adjustment 122 (see FIG. 1), data stream characteristic adjustment system 104 (see FIG. 1) modifies parameter(s) in request 114 (see FIG. 1) so that the level of resolution and/or the level of performance of data stream 124 (see FIG. 1) is downgraded, which causes the new expected amount of data usage to not exceed the data usage limit determined in step 206. After modifying the parameter(s) of request 114 (see FIG. 1), data stream characteristic adjustment system 104 (see FIG. 1) sends the modified request to application 118-1 (see FIG. 1). Subsequent to application 118-1 (see FIG. 1) receiving the modified request, application 118-1 (see FIG. 1) receives data stream 124 (see FIG. 1) with its downgraded level of resolution and/or downgraded level of performance. In one embodiment, the downgraded level of resolution and/or performance results in a data usage rate during the second portion of the specified time period to be less than the data usage rate determined in step 204.

Alternatively, data stream characteristic adjustment system 104 (see FIG. 1) notifies the user of computer 102 of the adjustment as a basis for a potential modification of request 114 (see FIG. 1) and prompts the user for an acceptance or a rejection of the potential modification. If the user rejects the potential modification, then data stream characteristic adjustment system 104 (see FIG. 1) keeps request 114 (see FIG. 1) unchanged. If the user accepts the potential modification, then data stream characteristic adjustment system 104 (see FIG. 1) modifies the parameter(s) of request 114 (see FIG. 1), sends the modified request 114 (see FIG. 1) to application 118-1 (see FIG. 1), and receives data stream 124 (see FIG. 1) with a downgraded level of resolution and/or downgraded level of performance, as discussed above.

In step 216, data stream characteristic adjustment system 104 (see FIG. 1) determines whether the specified time period has ended. If data stream characteristic adjustment system 104 (see FIG. 1) determines in step 216 that the specified time period has ended, then the Yes branch of step 216 is taken and the process of FIG. 2 ends at step 218. After step 216 and prior to ending the process of FIG. 2 at step 218, and based at least in part on the reception of data stream 124 (see FIG. 1) by application 118-1 (see FIG. 1) with the downgraded level of resolution and/or performance, data stream characteristic adjustment system 104 (see FIG. 1) determines an actual data usage provided by all data streams received by computer 102 during the entire specified time period does not exceed the data usage limit determined in step 206. The data stream characteristic adjustment system 104 (see FIG. 1) keeps the actual data usage during the entire specified time period from exceeding the data usage limit without an additional cost or other penalty being imposed on the user of computer 102 (see FIG. 1).

If data stream characteristic adjustment system 104 (see FIG. 1) determines in step 216 that the specified time period has not yet ended, then the No branch of step 216 is taken and the process of FIG. 2 loops back to step 202, with the end of the first portion being updated to the current time. By looping back to step 202, data stream characteristic adjustment system 104 (see FIG. 1) repeatedly updates the current rate of data usage up to the current time; repeatedly updates the expected amount of data usage based on the updated current rate, and repeatedly re-adjusts the characteristics of data streams that are requested in the second portion of the specified time period, such as data stream 124 (see FIG. 1), so that the updated expected amount of data usage is within a target range determined for the actual data usage within the entire time period. Each re-adjustment of a characteristic causes a decrease or an increase in a performance of the corresponding data stream 124 (see FIG. 1).

Returning to step 212, if data stream characteristic adjustment system 104 (see FIG. 1) determines that the expected amount of data usage determined in step 210 does not exceed the data usage limit determined in step 206, then the No branch of step 212 is followed and the process of FIG. 2 continues with step 216, as described above.

In another embodiment, the user has the option to engage or disengage the data stream characteristic adjustment system 104 (see FIG. 1) for a current or upcoming time period. For example, prior to the beginning of a billing cycle, a user of a mobile device knows that because the user will be traveling in other countries during the final week of the billing cycle, the user plans to have the mobile device turned off during the aforementioned final week. Based on the plan to have the mobile device turned off during the final week, the user disengages the data stream characteristic adjustment system 104 (see FIG. 1) for the entire billing cycle so that the user will not have to experience automatic downgrades of performances of data streams during the first three weeks of the billing cycle.

In another embodiment, data stream characteristic adjustment system 104 (see FIG. 1) determines N target ranges of amounts of actual data usage by respective applications 118-1, . . . , 118-N (see FIG. 1). The data stream characteristic adjustment system 104 (see FIG. 1) determines multiple current rates of data usage in the first portion of the specified time period by respective applications included in the N applications or by respective types of applications. Types of applications include video or moving streaming, audio file streaming, video conferencing, photo syncing, cloud data replication, etc. The current rates of data usage can be further subdivided based on categories of content such as feature movies, non-feature movies or videos, audio files of popular music, audio files of jazz music, audio files of classical music, etc. Based in part on the multiple current rates of data usage per application or type of application, data stream characteristic adjustment system 104 (see FIG. 1) determines expected amounts of data usage per application or type of application within the first and second portions of the time period. The data stream characteristic adjustment system 104 (see FIG. 1) determines whether the expected amounts of data usage are within the respective target ranges of amounts of actual data usage. Based on a determination that expected amount of data usage by application 118-1 (see FIG. 1) is not within the respective target range, data stream characteristic adjustment system 104 (see FIG. 1) determines the adjustment described above in step 214.

In the embodiment described above in which N target ranges of amounts of actual data usage is determined, data stream characteristic adjustment system 104 (see FIG. 1) adjusts characteristics of multiple data streams requested by applications 118-1, . . . , 118-N so that a total of the expected amounts of data usage by the applications does not exceed the data usage limit determined in step 206 (or does not exceed respective data usage limits corresponding to the applications). The adjustments to the characteristics allows data usage by the applications to be maintained throughout the specified time period, without a suspension, interruption, or shutdown of (1) any of the applications or (2) a service that provides one or more of the multiple data streams.

In another embodiment, data stream characteristic adjustment system 104 (see FIG. 1) assigns priorities to applications 118-1, . . . , 118-N (see FIG. 1) so that at least one of the applications outranks another one of the applications. The data stream characteristic adjustment system 104 (see FIG. 1) determines a first priority assigned to a first application and a second priority assigned to a second application, where the first and second applications are included in the N applications in FIG. 1. The data stream characteristic adjustment system 104 (see FIG. 1) determines that the first priority outranks the second priority. Based on a first application having a first priority that outranks the second priority of the second application, data stream characteristic adjustment system 104 (see FIG. 1) does not adjust any characteristic of any data stream requested by the first application throughout the second portion of the specified time period, but does adjust a characteristic of a data stream requested by the second application in the second portion so that the new expected data usage discussed in step 214 does not exceed the data usage limit determined in step 206.

Examples

Figure 3:
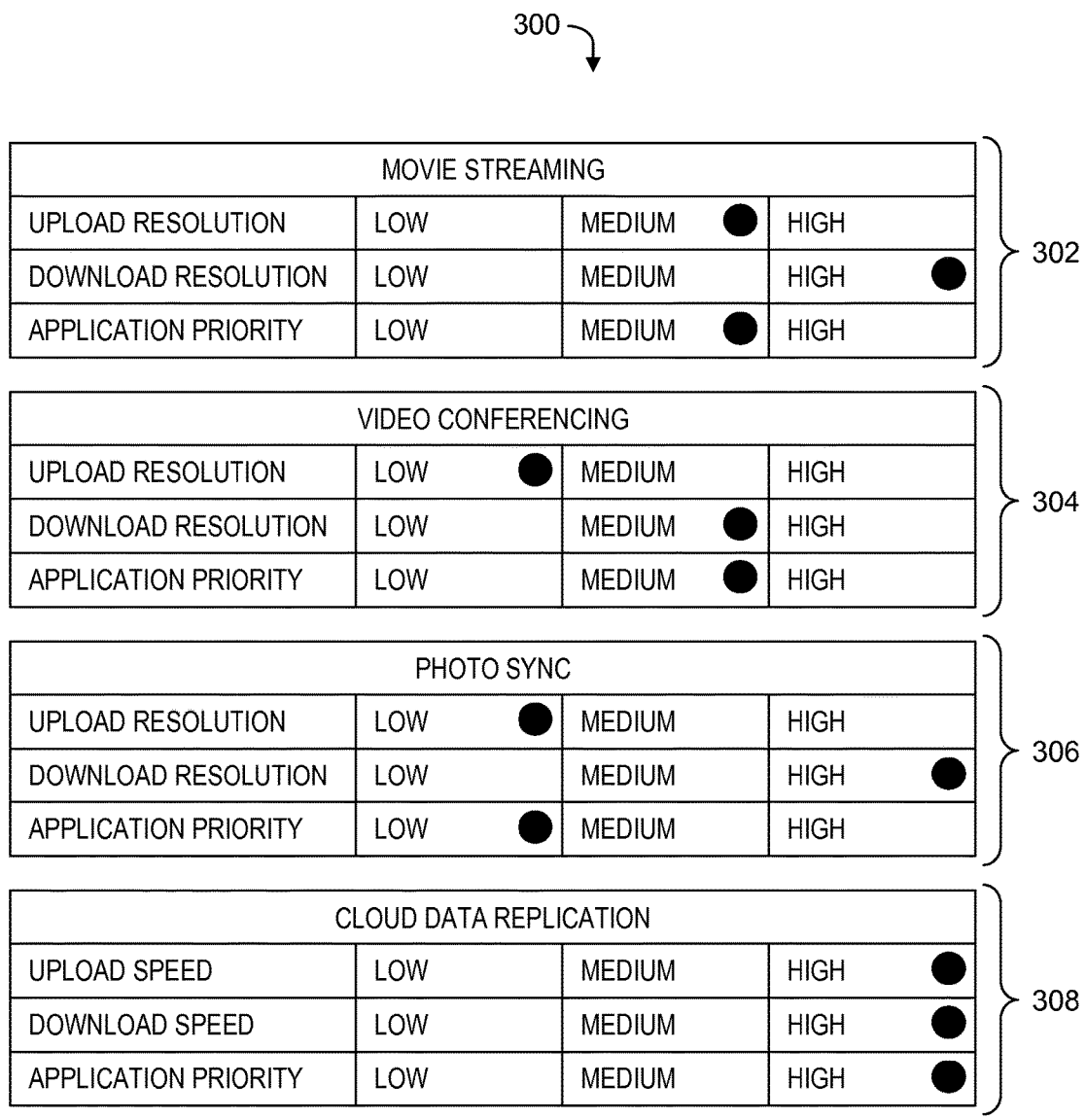
FIG. 3 depicts an exemplary user control panel for adjusting a data stream characteristic in the system of FIG. 1, in accordance with embodiments of the present invention.

FIG. 3 depicts an exemplary user control panel for adjusting a data stream characteristic in the system of FIG. 1, in accordance with embodiments of the present invention. User control panel component 112 (see FIG. 1) generates user control panel 300, which includes sections 302, 304, 306 and 308, each of which includes selections for characteristics of data streams requested by respective applications included in application 1, . . . application N (see FIG. 1). The selections are initially provided by and can be updated by a user of computer 102 (see FIG. 1) or are initially default values that can be changed by the user.

Section 302 includes characteristics of a first data stream which provides movie streaming. The characteristics in section 302 include upload resolution, download resolution and application priority with respect to the application included in application 1, . . . , application N (see FIG. 1) that provides movie streaming. The application priority is the level of priority the user assigns to the application that provides movie streaming. Each characteristic in section 302 includes a selection of Low, Medium, or High. The black circles in section 302 indicate that Medium is selected for upload resolution, High is selected for download resolution, and Medium is selected for application priority. Although not shown, section 302 includes a current setting of 720p for download and 1080p for upload.

Section 304 includes characteristics of a second data stream which provides video conferencing. The characteristics in section 304 include upload resolution, download resolution and application priority with respect to the application included in application 1, . . . , application N (see FIG. 1) that provides video conferencing. The application priority is the level of priority the user assigns to the application that provides video conferencing. Each characteristic in section 304 includes a selection of Low, Medium, or High. The black circles in section 304 indicate that Low is selected for upload resolution, Medium is selected for download resolution, and Medium is selected for application priority. Although not shown, section 304 includes a current setting of 720p for download and 720p for upload.

Section 306 includes characteristics of a third data stream which provides photo syncing. The characteristics in section 306 include upload resolution, download resolution and application priority with respect to the application included in application 1, . . . , application N (see FIG. 1) that provides photo syncing. The application priority is the level of priority the user assigns to the application that provides photo syncing. Each characteristic in section 306 includes a selection of Low, Medium, or High. The black circles in section 306 indicate that Low is selected for upload resolution, High is selected for download resolution, and Low is selected for application priority. Although not shown, section 306 includes a current setting of 640*480 for download and 640*480 for upload.

Section 308 includes characteristics of a fourth data stream which provides cloud data replication. The characteristics in section 308 include upload speed, download speed and application priority with respect to the application included in application 1, . . . , application N (see FIG. 1) that provides cloud data replication. The application priority is the level of priority the user assigns to the application that provides cloud data replication. Each characteristic in section 308 includes a selection of Low, Medium, or High. The black circles in section 308 indicate that High is selected for upload speed, download speed, and application priority.

Figure 4:
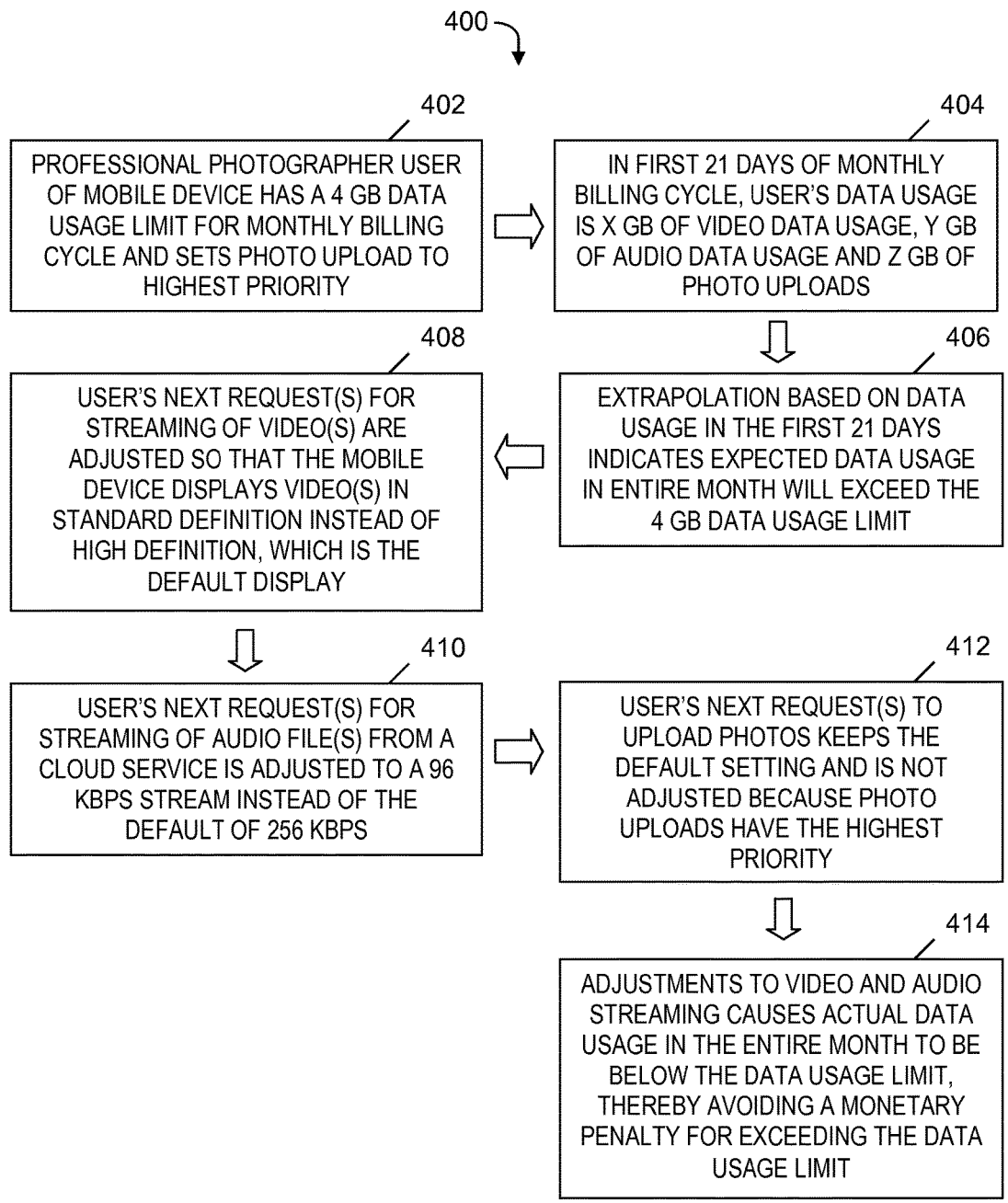
FIG. 4 is an exemplary process of adjusting characteristics of video and audio data streams in the system of FIG. 1, in accordance with embodiments of the present invention.

FIG. 4 is an exemplary process 400 of adjusting characteristics of video and audio data streams in the system of FIG. 1, in accordance with embodiments of the present invention. Sample process 400 starts at step 402. In step 402, a user of a mobile device (i.e., computer 102 in FIG. 1) is a professional photographer. The mobile device has a 4 gigabyte (GB) data usage limit for a monthly billing cycle. The service provider who manages the data streams for photo uploads from the mobile device and video and audio file streaming to the mobile device imposes a monetary penalty on the user if the data usage by the mobile device in a monthly billing cycle exceeds the 4 GB data usage limit.

Because the user is a professional photographer, the user assigns the highest priority to an application in the mobile device that provides photo uploads. That is, the application in the mobile device that provides photo uploads is assigned a level of priority that is higher than the levels of priority assigned to applications in the mobile device that provide video streaming and audio file streaming.

The application in the mobile device that provides video streaming has a default value that indicates that a video is displayed in high definition. The application in the mobile device that provides audio file streaming has a default value that indicates that an audio file is streamed from a cloud service to the mobile device at 256 kilobits per second (kbps).

In step 404, in the first 21 days of the monthly billing cycle, data stream characteristic adjustment system 104 (see FIG. 1) records X GB of data usage by the user for video streaming, Y GB of data usage by the user for audio file streaming, and Z GB of data usage by the user for photo uploads. Step 404 is an example of step 202 in FIG. 2.

In step 406, data stream characteristic adjustment system 104 (see FIG. 1) extrapolates expected data usage in the entire monthly billing cycle based on the data usage recorded in step 404 over the first 21 days in the monthly billing cycle. Data stream characteristic adjustment system 104 (see FIG. 1) determines that the expected data usage for the entire monthly billing cycle exceeds the 4 GB data usage limit. Step 406 is an example of steps 210 and 212 in FIG. 2.

In step 408, data stream characteristic adjustment system 104 (see FIG. 1) generates an adjustment 122 (see FIG. 1) to the user's next request(s) for streaming of video(s) so that the mobile device will display the video(s) in standard definition instead of the default display of high definition.

In step 410, data stream characteristic adjustment system 104 (see FIG. 1) generates another adjustment 122 (see FIG. 1) to the user's next request(s) for streaming of audio file(s) from a cloud service, so that the cloud service streams the audio files to the mobile device at 96 kbps instead of the default speed of 256 kbps. Steps 408 and 410 are examples of step 214.

In step 412, data stream characteristic adjustment system 104 (see FIG. 1) does not generate an adjustment to the default settings for photo uploads because the application providing the photo upload has the highest priority.

In step 414, data stream characteristic adjustment system 104 (see FIG. 1) continues to monitor data usage by the mobile device and determines that the adjustments generated in steps 408 and 410 causes actual data usage in the entire monthly billing cycle to be below the data usage limit of 4 GB, thereby allowing the user to avoid the monetary penalty that would have been imposed by the service provider if the actual data usage by the mobile device in the entire monthly billing cycle had exceeded the 4 GB limit.

Computer System

Figure 5:
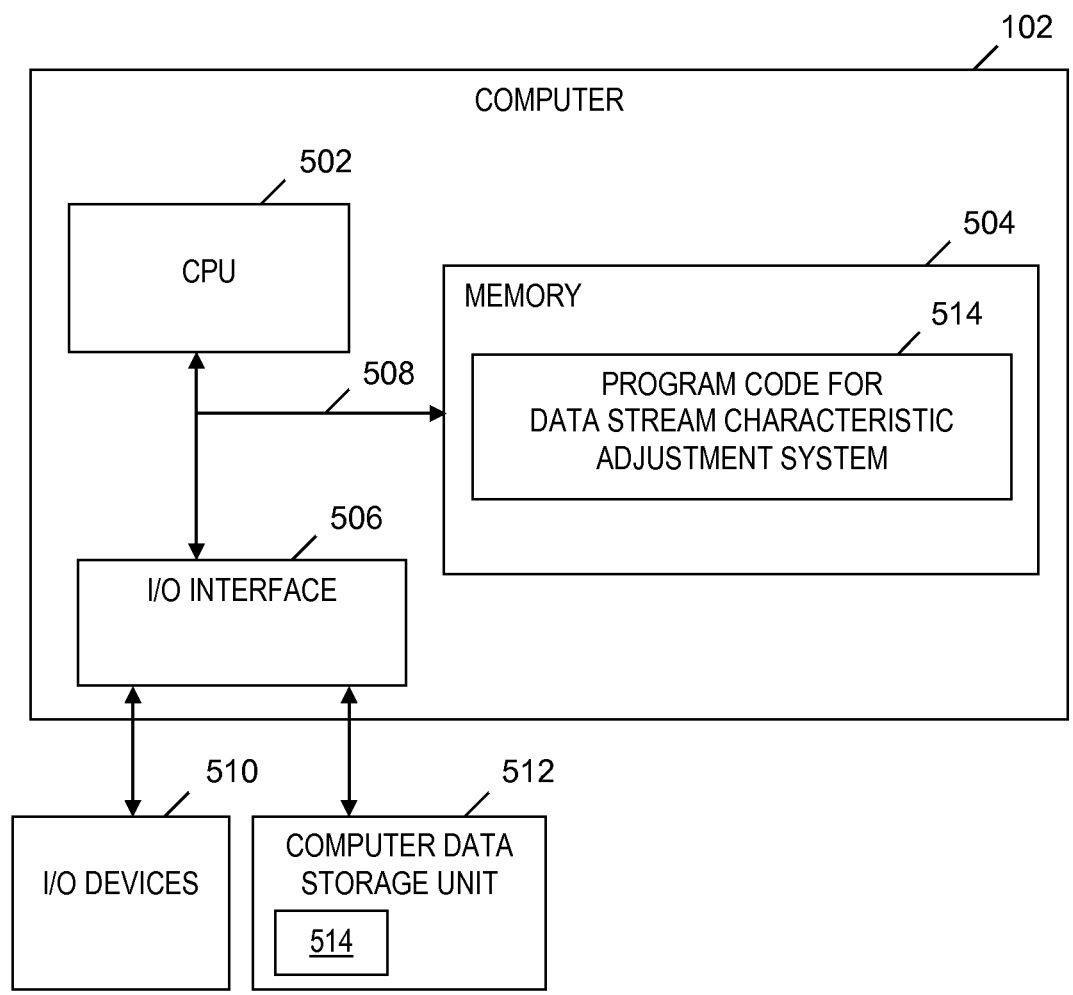
FIG. 5 is a block diagram of a computer that is included in the system of FIG. 1 and that implements the process of FIG. 2, in accordance with embodiments of the present invention.

FIG. 5 is a block diagram of a computer that is included in the system of FIG. 1 and that implements the process of FIG. 2, in accordance with embodiments of the present invention. Computer 102 is a computer system or mobile computing device that generally includes a central processing unit (CPU) 502, a memory 504, an input/output (I/O) interface 506, and a bus 508. Further, computer 102 is coupled to I/O devices 510 and a computer data storage unit 512. CPU 502 performs computation and control functions of computer 102, including carrying out instructions included in program code 514 to perform a method of adjusting a characteristic of a data stream based on a data usage rate, where the instructions are carried out by CPU 502 via memory 504. CPU 502 may include a single processing unit, or be distributed across one or more processing units in one or more locations (e.g., on a client and server). Program code 514 includes program code for data stream characteristic adjustment system 104 (see FIG. 1).

Memory 504 includes a known computer readable storage medium, which is described below. In one embodiment, cache memory elements of memory 504 provide temporary storage of at least some program code (e.g., program code 514) in order to reduce the number of times code must be retrieved from bulk storage while instructions of the program code are carried out. Moreover, similar to CPU 502, memory 504 may reside at a single physical location, including one or more types of data storage, or be distributed across a plurality of physical systems in various forms. Further, memory 504 can include data distributed across, for example, a local area network (LAN) or a wide area network (WAN).

I/O interface 506 includes any system for exchanging information to or from an external source. I/O devices 510 include any known type of external device, including a display device, keyboard, etc. Bus 508 provides a communication link between each of the components in computer 102, and may include any type of transmission link, including electrical, optical, wireless, etc.

I/O interface 506 also allows computer 102 to store information (e.g., data or program instructions such as program code 514) on and retrieve the information from computer data storage unit 512 or another computer data storage unit (not shown). Computer data storage unit 512 includes a known computer-readable storage medium, which is described below. In one embodiment, computer data storage unit 512 is a non-volatile data storage device, such as a magnetic disk drive (i.e., hard disk drive) or an optical disc drive (e.g., a CD-ROM drive which receives a CD-ROM disk).

Memory 504 and/or storage unit 512 may store computer program code 514 that includes instructions that are carried out by CPU 502 via memory 504 to adjust a characteristic of a data stream based on a data usage rate. Although FIG. 5 depicts memory 504 as including program code 514, the present invention contemplates embodiments in which memory 504 does not include all of code 514 simultaneously, but instead at one time includes only a portion of code 514.

Further, memory 504 includes an operating system (not shown) and may include other systems not shown in FIG. 5.

Storage unit 512 and/or one or more other computer data storage units (not shown) that are coupled to computer 102 may include data store 116 (see FIG. 1).

As will be appreciated by one skilled in the art, in a first embodiment, the present invention may be a system; in a second embodiment, the present invention may be a method; and in a third embodiment, the present invention may be a computer program product.

Any of the components of an embodiment of the present invention can be deployed, managed, serviced, etc. by a service provider that offers to deploy or integrate computing infrastructure with respect to adjusting a characteristic of a data stream based on a data usage rate. Thus, an embodiment of the present invention discloses a process for supporting computer infrastructure, where the process includes providing at least one support service for at least one of integrating, hosting, maintaining and deploying computer-readable code (e.g., program code 514) in a computer system (e.g., computer 102) including one or more processors (e.g., CPU 502), wherein the processor(s) carry out instructions contained in the code causing the computer system to adjust a characteristic of a data stream based on a data usage rate. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of adjusting a characteristic of a data stream based on a data usage rate.

While it is understood that program code 514 for adjusting a characteristic of a data stream based on a data usage rate may be deployed by manually loading directly in client, server and proxy computers (not shown) via loading a computer-readable storage medium (e.g., computer data storage unit 512), program code 514 may also be automatically or semi-automatically deployed into computer 102 by sending program code 514 to a central server or a group of central servers. Program code 514 is then downloaded into client computers (e.g., computer 102) that will execute program code 514. Alternatively, program code 514 is sent directly to the client computer via e-mail. Program code 514 is then either detached to a directory on the client computer or loaded into a directory on the client computer by a button on the e-mail that executes a program that detaches program code 514 into a directory. Another alternative is to send program code 514 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 514 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of adjusting a characteristic of a data stream based on a data usage rate. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 504 and computer data storage unit 512) having computer readable program instructions 514 thereon for causing a processor (e.g., CPU 502) to carry out aspects of the present invention.

The computer readable storage medium can be a tangible device that can retain and store instructions (e.g., program code 514) for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 514) described herein can be downloaded to respective computing/processing devices (e.g., computer 102) from a computer readable storage medium or to an external computer or external storage device (e.g., computer data storage unit 512) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 514) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 5) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 514).

These computer readable program instructions may be provided to a processor (e.g., CPU 502) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 512) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 514) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of adjusting a characteristic of a data stream to a computer, the method comprising the steps of:
a computer system recording an amount of data usage provided by one or more data streams to the computer within a first portion of a time period, the first portion having elapsed and the time period not having elapsed, and the computer system having at least one processor and at least one memory;
based on the recorded amount of data usage and an amount of time in the first portion, the computer system determining a current rate of data usage provided by the one or more data streams within the first portion of the time period;
the computer system determining a limit on actual data usage by the computer during an entirety of the time period;
the computer system determining an amount of time in a second portion of the time period, which is subsequent to the first portion and has not elapsed;
the computer system determining a historical data usage by the computer in portions of respective historical time periods, wherein durations of the portions of the respective historical time periods and the second portion of the time periods are similar, wherein the durations being similar indicates that the durations are identical, and wherein each of the portions of the respective historical time periods has a similarity to the second portion of the time period, the similarity based on the second portion being a specified ordered duration of time within the time period and the specified ordered duration of time matching an ordered duration of time within each of the historical time periods, each of the portions of the respective historical time periods being the ordered duration of time;
based on the historical data usage, the computer system determining an anticipated data usage in the second portion of the time period;
based at least in part on the amount of time in the second portion, the current rate of data usage, and the anticipated data usage in the second portion of the time period based on the historical data usage in the portions of the historical time periods having the similarity to the second portion of the time period, the computer system determining an expected amount of data usage provided by all data streams to the computer within the first and second portions of the time period;
the computer system determining the expected amount of data usage exceeds the limit;
based in part on the expected amount of data usage exceeding the limit, the computer system determining an adjustment of the characteristic of the data stream;
based in part on the expected amount of data usage exceeding the limit, the computer system making the adjustment to the characteristic of the data stream, which causes a downgrade of a quality of a content provided by the data stream within the second portion of the time period;
the computer system calculating a new expected data usage provided by at least the one or more data streams within the first portion of the time period and the data stream within the second portion of the time period, the adjustment to the characteristic of the data stream having been made causing the calculated new expected data usage to not exceed the limit;
the computer system intercepting a request for the data stream before the request is sent to an application, the request indicating a level of display resolution of the data stream which streams video;
in response to the step of intercepting and based on the adjustment to the characteristic, the computer system modifying the request so that the level of display resolution of the data stream is downgraded;
the computer system sending the modified request to the application; and
based on the anticipated data usage in the second portion of the time period being based on the historical data usage in the portions of the historical time periods having the similarity to the second portion of the time period, the adjustment to the characteristic of the data stream having been made which causes the downgrade of the quality of the content provided by the data stream within the second portion of the time period, a reception by the application of the modified request, and the data stream having the downgraded level of display resolution, the computer system keeping an actual data usage provided by all data streams received by the computer during the entirety of the time period from exceeding the limit, which avoids an overage cost for exceeding the limit.

2. The method of claim 1, further comprising the steps of:
the computer system determining target ranges of amounts of actual data usage by respective applications or by respective types of applications within the time period;
the computer system determining current rates of data usage by the applications or by the types of applications within the first portion of the time period;
based in part on the current rates of data usage, the computer system determining expected amounts of data usage by the applications or by the types of applications within the first and second portions of the time period; and the computer system determining whether the expected amounts of data usage are within the target ranges of amounts, and in response, determining the expected amount of data usage is not within a corresponding target range included in the target ranges, wherein the step of making the adjustment to the characteristic of the data stream is based in part on the expected amount of data usage not being with the corresponding target range.

3. The method of claim 2, further comprising the step of:
the computer system adjusting characteristics of multiple data streams requested by the applications so that a total of the expected amounts of data usage by the applications does not exceed the limit and the data usage by the applications is maintained throughout the time period without a suspension, interruption or shutdown of (1) any of the applications or (2) a service that provides one or more of the multiple data streams.

4. The method of claim 2, further comprising the steps of:
the computer system determining a first application included in the applications has a first priority and determining a second application included in the applications has a second priority, the first priority outranking the second priority; and based on the first priority outranking the second priority, the computer system (1) keeping characteristics of a first data stream requested by the first application unadjusted throughout the time period, and (2) adjusting a characteristic of a second data stream requested by the second application so that the new expected data usage does not exceed the limit, wherein the step of making the adjustment includes the step of adjusting the characteristic of the second data stream.

5. The method of claim 1, further comprising the steps of:
the computer system determining a target range of actual data usage during the entirety of the time period; and repeatedly within the second portion of the time period,
the computer system updating a rate of data usage by the computer up to a current time;
based on the updated rate of data usage, the computer system updating the expected amount of data usage; and
the computer system determining and making a re-adjustment of the characteristic of the data stream so that the updated expected amount of data usage is within the target range, wherein the step of making the re-adjustment causes a decrease or an increase in a performance of the data stream.

6. The method of claim 1, further comprising the step of:
providing at least one support service for at least one of creating, integrating, hosting, maintaining, and deploying computer-readable program code in the computer system, the program code being executed by a processor of the computer system to implement the steps of recording, determining the current rate of data usage, determining the limit, determining the amount of time in the second portion, determining the historical data usage, determining the anticipated data usage in the second portion of the time period, determining the expected amount of data usage within the first and second portions of the time period, determining the expected amount of data usage exceeds the limit, determining the adjustment of the characteristic of the data stream, making the adjustment to the characteristic of the data stream, calculating the new expected data usage, intercepting the request, modifying the request, sending the modified request, keeping the actual data usage from exceeding the limit, and avoiding the overage cost.

7. A computer system comprising:
a central processing unit (CPU);
a memory coupled to the CPU; and
a computer-readable storage device coupled to the CPU, the storage device containing instructions that are executed by the CPU via the memory to implement a method of adjusting a characteristic of a data stream to a computer, the method comprising the steps of:
the computer system recording an amount of data usage provided by one or more data streams to the computer within a first portion of a time period, the first portion having elapsed and the time period not having elapsed;
based on the recorded amount of data usage and an amount of time in the first portion, the computer system determining a current rate of data usage provided by the one or more data streams within the first portion of the time period;
the computer system determining a limit on actual data usage by the computer during an entirety of the time period;
the computer system determining an amount of time in a second portion of the time period, which is subsequent to the first portion and has not elapsed;
the computer system determining a historical data usage by the computer in portions of respective historical time periods, wherein durations of the portions of the respective historical time periods and the second portion of the time periods are similar, wherein the durations being similar indicates that the durations are identical, and wherein each of the portions of the respective historical time periods has a similarity to the second portion of the time period, the similarity based on the second portion being a specified ordered duration of time within the time period and the specified ordered duration of time matching an ordered duration of time within each of the historical time periods, each of the portions of the respective historical time periods being the ordered duration of time;
based on the historical data usage, the computer system determining an anticipated data usage in the second portion of the time period;
based at least in part on the amount of time in the second portion, the current rate of data usage, and the anticipated data usage in the second portion of the time period based on the historical data usage in the portions of the historical time periods having the similarity to the second portion of the time period, the computer system determining an expected amount of data usage provided by all data streams to the computer within the first and second portions of the time period;
the computer system determining the expected amount of data usage exceeds the limit;
based in part on the expected amount of data usage exceeding the limit, the computer system determining an adjustment of the characteristic of the data stream;
based in part on the expected amount of data usage exceeding the limit, the computer system making the adjustment to the characteristic of the data stream, which causes a downgrade of a quality of a content provided by the data stream within the second portion of the time period;

the computer system calculating a new expected data usage provided by at least the one or more data streams within the first portion of the time period and the data stream within the second portion of the time period, the adjustment to the characteristic of the data stream having been made causing the calculated new expected data usage to not exceed the limit;

the computer system intercepting a request for the data stream before the request is sent to an application, the request indicating a level of display resolution of the data stream which streams video;

in response to the step of intercepting and based on the adjustment to the characteristic, the computer system modifying the request so that the level of display resolution of the data stream is downgraded;

the computer system sending the modified request to the application; and based on the anticipated data usage in the second portion of the time period being based on the historical data usage in the portions of the historical time periods having the similarity to the second portion of the time period, the adjustment to the characteristic of the data stream having been made which causes the downgrade of the quality of the content provided by the data stream within the second portion of the time period, a reception by the application of the modified request, and the data stream having the downgraded level of display resolution, the computer system keeping an actual data usage provided by all data streams received by the computer during the entirety of the time period from exceeding the limit, which avoids an overage cost for exceeding the limit.

8. The computer system of claim 7, wherein the method further comprises the steps of:

the computer system determining target ranges of amounts of actual data usage by respective applications or by respective types of applications within the time period;

the computer system determining current rates of data usage by the applications or by the types of applications within the first portion of the time period;

based in part on the current rates of data usage, the computer system determining expected amounts of data usage by the applications or by the types of applications within the first and second portions of the time period; and the computer system determining whether the expected amounts of data usage are within the target ranges of amounts, and in response, determining the expected amount of data usage is not within a corresponding target range included in the target ranges, wherein the step of making the adjustment to the characteristic of the data stream is based in part on the expected amount of data usage not being with the corresponding target range.

9. The computer system of claim 8, wherein the method further comprises the step of: the computer system adjusting characteristics of multiple data streams requested by the applications so that a total of the expected amounts of data usage by the applications does not exceed the limit and the data usage by the applications is maintained throughout the time period without a suspension, interruption or shutdown of (1) any of the applications or (2) a service that provides one or more of the multiple data streams.

10. The computer system of claim 8, wherein the method further comprises the steps of:

the computer system determining a first application included in the applications has a first priority and determining a second application included in the applications has a second priority, the first priority outranking the second priority; and based on the first priority outranking the second priority, the computer system (1) keeping characteristics of a first data stream requested by the first application unadjusted throughout the time period, and (2) adjusting a characteristic of a second data stream requested by the second application so that the new expected data usage does not exceed the limit, wherein the step of making the adjustment includes the step of adjusting the characteristic of the second data stream.

11. The computer system of claim 7, wherein the method further comprises the steps of:

the computer system determining a target range of actual data usage during the entirety of the time period; and repeatedly within the second portion of the time period,
the computer system updating a rate of data usage by the computer up to a current time;

based on the updated rate of data usage, the computer system updating the expected amount of data usage; and the computer system determining and making a re-adjustment of the characteristic of the data stream so that the updated expected amount of data usage is within the target range, wherein the step of making the re-adjustment causes a decrease or an increase in a performance of the data stream.

12. A computer program product, comprising:

a computer-readable storage device; and a computer-readable program code stored in the computer-readable storage device, the computer-readable program code containing instructions that are executed by a central processing unit (CPU) of a computer system to implement a method of adjusting a characteristic of a data stream to a computer, the method comprising the steps of:

the computer system recording an amount of data usage provided by one or more data streams to the computer within a first portion of a time period, the first portion having elapsed and the time period not having elapsed;

based on the recorded amount of data usage and an amount of time in the first portion, the computer system determining a current rate of data usage provided by the one or more data streams within the first portion of the time period;

the computer system determining a limit on actual data usage by the computer during an entirety of the time period;

the computer system determining an amount of time in a second portion of the time period, which is subsequent to the first portion and has not elapsed;

the computer system determining a historical data usage by the computer in portions of respective historical time periods, wherein durations of the portions of the respective historical time periods and the second portion of the time periods are similar, wherein the durations being similar indicates that the durations are identical, and wherein each of the portions of the respective historical time periods has a similarity to the second portion of the time period, the similarity based on the second portion being a specified ordered duration of time within the time period and the specified ordered duration of time matching an ordered duration of time within each of the historical time periods, each of the portions of the respective historical time periods being the ordered duration of time;

based on the historical data usage, the computer system determining an anticipated data usage in the second portion of the time period;

based at least in part on the amount of time in the second portion, the current rate of data usage, and the anticipated data usage in the second portion of the time period based on the historical data usage in the portions of the historical time periods having the similarity to the second portion of the time period, the computer system determining an expected amount of data usage provided by all data streams to the computer within the first and second portions of the time period;

the computer system determining the expected amount of data usage exceeds the limit;

based in part on the expected amount of data usage exceeding the limit, the computer system determining an adjustment of the characteristic of the data stream;

based in part on the expected amount of data usage exceeding the limit, the computer system making the adjustment to the characteristic of the data stream, which causes a downgrade of a quality of a content provided by the data stream within the second portion of the time period;

the computer system calculating a new expected data usage provided by at least the one or more data streams within the first portion of the time period and the data stream within the second portion of the time period, the adjustment to the characteristic of the data stream having been made causing the calculated new expected data usage to not exceed the limit;

the computer system intercepting a request for the data stream before the request is sent to an application, the request indicating a level of display resolution of the data stream which streams video;

in response to the step of intercepting and based on the adjustment to the characteristic, the computer system modifying the request so that the level of display resolution of the data stream is downgraded;

the computer system sending the modified request to the application; and based on the anticipated data usage in the second portion of the time period being based on the historical data usage in the portions of the historical time periods having the similarity to the second portion of the time period, the adjustment to the characteristic of the data stream having been made which causes the downgrade of the quality of the content provided by the data stream within the second portion of the time period, a reception by the application of the modified request, and the data stream having the downgraded level of display resolution, the computer system keeping an actual data usage provided by all data streams received by the computer during the entirety of the time period from exceeding the limit, which avoids an overage cost for exceeding the limit.

13. The computer program product of claim 12, wherein the method further comprises the steps of:

the computer system determining target ranges of amounts of actual data usage by respective applications or by respective types of applications within the time period;

the computer system determining current rates of data usage by the applications or by the types of applications within the first portion of the time period;

based in part on the current rates of data usage, the computer system determining expected amounts of data usage by the applications or by the types of applications within the first and second portions of the time period; and the computer system determining whether the expected amounts of data usage are within the target ranges of amounts, and in response, determining the expected amount of data usage is not within a corresponding target range included in the target ranges, wherein the step of making the adjustment to the characteristic of the data stream is based in part on the expected amount of data usage not being with the corresponding target range.

14. The computer program product of claim 13, wherein the method further comprises the step of: the computer system adjusting characteristics of multiple data streams requested by the applications so that a total of the expected amounts of data usage by the applications does not exceed the limit and the data usage by the applications is maintained throughout the time period without a suspension, interruption or shutdown of (1) any of the applications or (2) a service that provides one or more of the multiple data streams.

15. The computer program product of claim 13, wherein the method further comprises the steps of:

the computer system determining a first application included in the applications has a first priority and determining a second application included in the applications has a second priority, the first priority outranking the second priority; and based on the first priority outranking the second priority, the computer system (1) keeping characteristics of a first data stream requested by the first application unadjusted throughout the time period, and (2) adjusting a characteristic of a second data stream requested by the second application so that the new expected data usage does not exceed the limit, wherein the step of making the adjustment includes the step of adjusting the characteristic of the second data stream.

16. The computer program product of claim 12, wherein the method further comprises the steps of:

the computer system determining a target range of actual data usage during the entirety of the time period; and repeatedly within the second portion of the time period, the computer system updating a rate of data usage by the computer up to a current time;

based on the updated rate of data usage, the computer system updating the expected amount of data usage; and the computer system determining and making a re-adjustment of the characteristic of the data stream so that the updated expected amount of data usage is within the target range, wherein the step of making the re-adjustment causes a decrease or an increase in a performance of the data stream.

* * * * *